(12) United States Patent
Feng et al.

(10) Patent No.: US 8,326,074 B2
(45) Date of Patent: Dec. 4, 2012

(54) METHOD AND APPARATUS FOR FIR FILTERING USING SPACE-VARYING ROTATION

(75) Inventors: Guotong Feng, Mountain View, CA (US); Mohammed Shoaib, Princeton, NJ (US); Edward L. Schwartz, Sunnyvale, CA (US); M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 664 days.

(21) Appl. No.: 12/488,479

(22) Filed: Jun. 19, 2009

(65) Prior Publication Data

US 2010/0322530 A1   Dec. 23, 2010

(51) Int. Cl.
G06K 9/40 (2006.01)
(52) U.S. Cl. .................... 382/260; 382/296; 382/297
(58) Field of Classification Search .................. 382/100, 382/254, 260, 276, 296, 297
See application file for complete search history.

(56) References Cited

U.S. PATENT DOCUMENTS

| | | | |
|---|---|---|---|
| 6,009,447 A | 12/1999 | Kubota et al. | |
| 6,172,670 B1 | 1/2001 | Oka et al. | |
| 6,445,182 B1 | 9/2002 | Dean et al. | |
| 6,538,634 B1 * | 3/2003 | Chui et al. | 345/156 |
| 6,782,142 B2 * | 8/2004 | Loce et al. | 382/296 |
| 6,801,674 B1 * | 10/2004 | Turney | 382/298 |
| 7,616,841 B2 | 11/2009 | Robinson et al. | |
| 2006/0269152 A1 * | 11/2006 | Fenney | 382/232 |
| 2006/0280376 A1 | 12/2006 | Lei | |
| 2007/0009181 A1 * | 1/2007 | Leung et al. | 382/296 |
| 2008/0007648 A1 * | 1/2008 | Chen et al. | 348/441 |
| 2008/0298678 A1 | 12/2008 | Kang | |

OTHER PUBLICATIONS

Park et al. "Directional filter bank-based fingerprint feature extraction and matching" IEEE Transactions on Circuits and Systems for Video Technology, Jan. 2004, pp. 74-85.*
Adorf, Hans-Martin, "Towards Restoration with a Space-Variant PSF, Cosmic Rays and Other Missing Data," The Restoration of HST Images and Spectra II Space Telescope Science Institute, Apr. 1994, pp. 72-78.
Cheung, Ocean Y H, et al, "A Scalable FPGA Implementation of Cellular Neural Networks for Gabor-type Filtering," International Joint Conference on Neural Networks, Vancouver BC Canada, Jul. 16-21, 2006, pp. 15-20.
Hanke, Martin, et al, "Regularization Methods for Large-Scale Problems," Suv. Math. Ind. (1993) 3: pp. 253-315.
McNown, Scott R, "Approximate Shift-Invariance by Warping Shift-Variant Systems," The Restoration of HST Images and Spectra II Space Telescope Science Institute, Apr. 1994, pp. 181-187.

(Continued)

*Primary Examiner* — Stephen R Koziol
(74) *Attorney, Agent, or Firm* — Blakely, Sokoloff, Taylor & Zafman LLP

(57) ABSTRACT

A method and apparatus for finite impulse response (FIR) filter bank architecture and method that involve low-complexity computation resources are described. In one embodiment, a digital image processing system includes an index mapping module to determine a rotation angle index to control rotation of an input patch of an image based on the (x,y) pixel coordinates of the image patch. The digital image processing system may also include a rotation module to rotate the input patch of the image based on the rotation angle index. In one embodiment, the digital image processing system may further include a filter engine module applied to a rotated version of the input patch of the image.

15 Claims, 14 Drawing Sheets

OTHER PUBLICATIONS

Nagy, James G, et al, "Iterative Image Restoration Using Approximate Inverse Preconditionng," IEEE Transactions on Image Processing, vol. 5, No. 7, Jul. 1996, pp. 1151-1162.

Nagy, James G, et al, "Restoring Images Degraded by Spatially Variant Blur," SIAM J Sci Comput, vol. 19, No. 4, Jul. 1998, pp. 1063-1082.

Qiang, Lin, et al, "FPGA Implementation of Pipelined Architecture for Optical Imaging Distortion Correction," IEEE Workshop on SIPS '06, Manuscript Received Jun. 9, 2006, 6 pages.

Robinson, M Dirk, et al, "Joint Design of Lens Systems and Digital Image Processing," International Optical Design Conference (IODC), Jun. 2006, 10 pages.

* cited by examiner

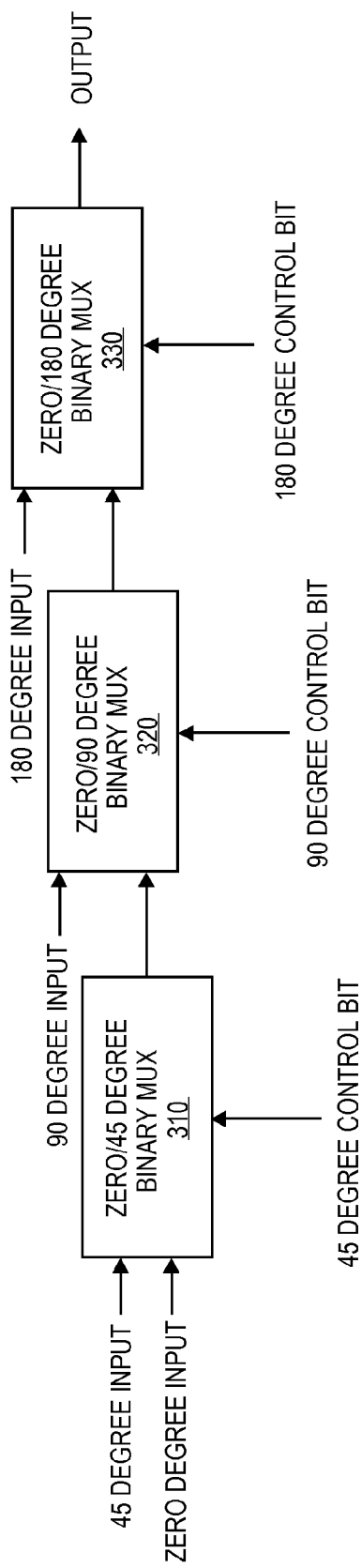
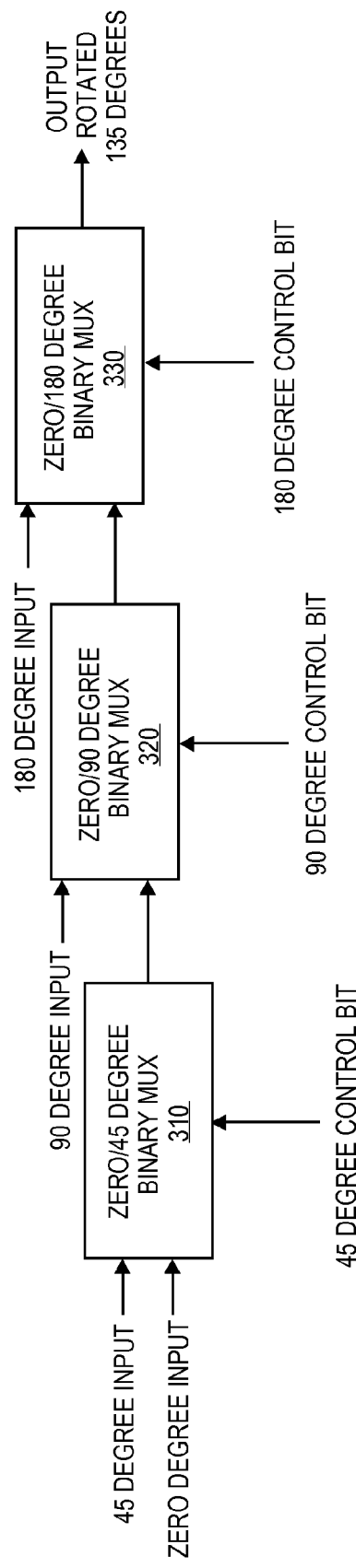
FIG. 3A
FIG. 3B

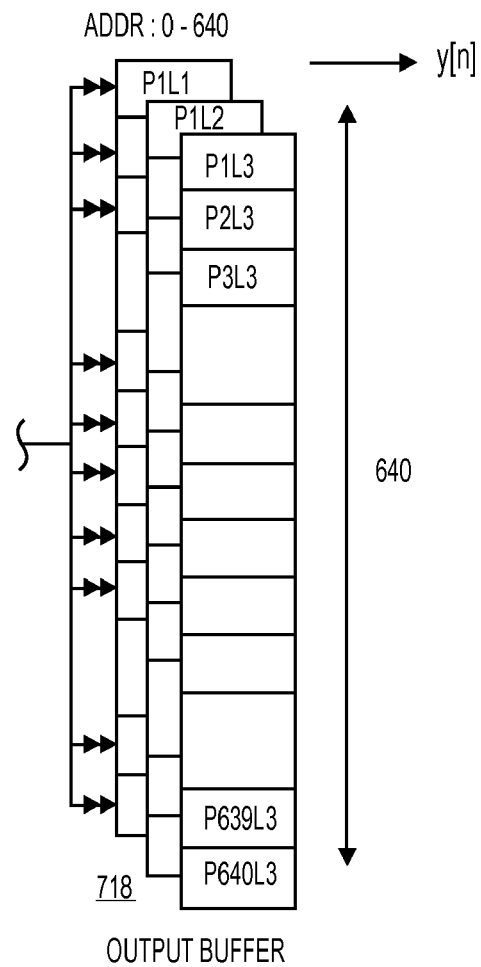
**FIG. 7
(CONT.)**
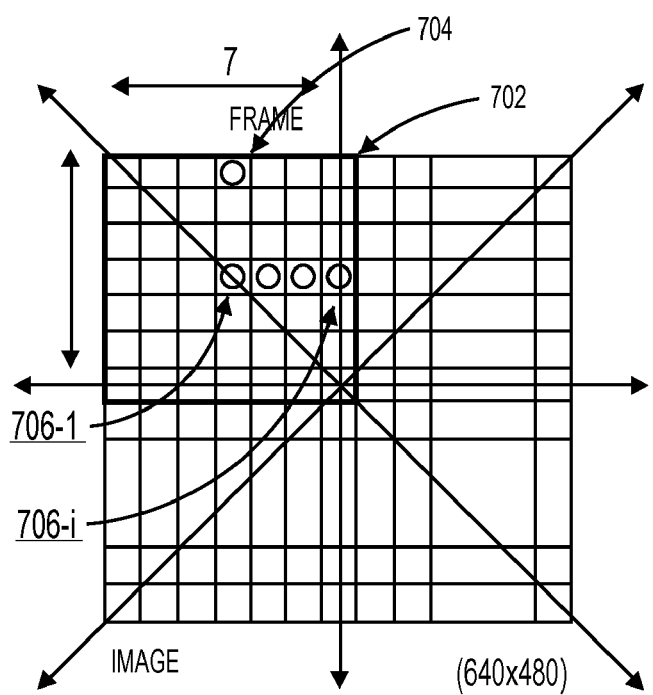

METHOD AND APPARATUS FOR FIR FILTERING USING SPACE-VARYING ROTATION

FIELD OF THE INVENTION

The present invention relates to the field of optical imaging systems; more particularly, the present invention relates to a finite impulse response (FIR) filter bank architecture and methods that involve low-complexity computation and resources.

BACKGROUND OF THE INVENTION

Electro-optic imaging systems typically include imaging optics (e.g., a lens or minor assembly), an electronic sensor array (e.g., CCD detector array) and a digital image processor (e.g., implemented in dedicated chips or software). Traditional methods for designing these systems generally involve fairly independent steps. The optics are designed with the goal of forming a high quality intermediate optical image at the sensor array. The sensor array often is dictated by the intended application, including resolution and cost factors. Often, the digital image processing is designed after the optics, with the goal of compensating for remaining defects in the sampled intermediate optical image.

The design stages occur with very little coordination between the optical designer and the image processing designer. The separation of these stages is a reflection of the significant differences between the fields of optics and image processing in their goals, methods, tools and constraints. For example, each field covers a large swath of potential applications but there is little overlap between the two fields other than the design of electro-optic imaging systems. The design of conventional microscopes, telescopes, eyeglasses, etc. does not consider any significant image processing. Likewise, areas of image processing such as compression, computer graphics, and image enhancement typically do not involve any significant optics. As a result, each field has evolved independent of the other and with its own unique terminology, best practices, and set of tools.

There has been recent interest in taking advantage of these possible synergies. For example, U.S. patent application Ser. No. 11/155,870 entitled "End-To-End Design of Electro-Optic Imaging Systems" to Robinson and Stork concerns a general approach to designing an imaging system by allowing the imaging optics and image processing to compensate each other. Thus, while neither the optics nor the image processing may be optimal when considered alone, the interaction of the two produces good results. Put in another way, in order to achieve a certain overall image quality, this approach allows the use of lower quality optics and/or lower quality image processing so long as the two compensate each other to achieve the desired performance.

However, the optics of such imaging systems introduce strong optical aberrations that are often both rotationally asymmetric and space-varying. To compensate for these aberrations, in digital image processing, a large set of different finite impulse response (FIR) filters may be required for each orientation or location to compensate for the blur artifacts caused by the optical aberrations in the corresponding region. However, the implementation of such many FIR filters in hardware requires significantly expensive computation resources.

The implementation of space-varying FIR filters in software has been widely studied, with astronomy as one of the most studied fields of use. A number of algorithms for space-varying de-blurring processes have been proposed to improve the performance (typically speed) of computations. These software algorithms employ fast iterative methods, or fast matrix-vector products using linear interpolation. However, the complexity and memory requirements of these algorithms make them impractical for low-cost hardware implementation.

U.S. Pat. No. 6,009,447, entitled "Method and System for Generating and Implementing Orientational Filters for Real-Time Computer Vision Applications," provides a method for representing and implementing a set of digital orientational filters (e.g., Gabor filters) on VLSI hardware based systems. The orientational filter set is represented as filter banks each containing a linear sum of separable 1-D filter kernels. The goal is to identify the orientation of the target object frame by frame from the video data in real-time. The solution provided in this patent requires significant intermediate memory buffers in hardware, and also a high complexity of computation resources for implementing the separable 1-D filter banks. One method for implementing real-time image rotation and image resizing on hardware is disclosed in U.S. Pat. No. 6,801,674, entitled "Real-Time Image Resizing and Rotation with Line Buffers." The real-time image rotation method has a sophisticated structure including a bi-cubic interpolation processor, index generator, and rotation control logic. The output of this system is a rotated and resized version of the input image, requiring relatively expensive interpolation, index, and control logic.

Each of these methods involves a relatively high level of computation complexity, and associated expense, to perform their respective image processing operations.

SUMMARY OF THE INVENTION

A method and apparatus for finite impulse response (FIR) filter bank architecture and methods that involve low-complexity computation resources are described. In one embodiment, a digital image processing system includes an index mapping module to determine a rotation angle index to control rotation of an input patch of an image based on the (x,y) pixel coordinates of the image patch. The digital image processing system may also contain a rotation module to rotate the input patch of the image based on the rotation angle index. In one embodiment, the digital image processing system may further include a filter engine module applied to a rotated version of the input patch of the image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A illustrates one embodiment of an architecture for space-varying rotation using a rotation control index for rotating input image data.

FIG. 3B illustrates one embodiment of an architecture for a space-varying rotation using a 3-bit rotation control index for rotating the input image data.

DETAILED DESCRIPTION OF THE PRESENT INVENTION

Figure 1B:
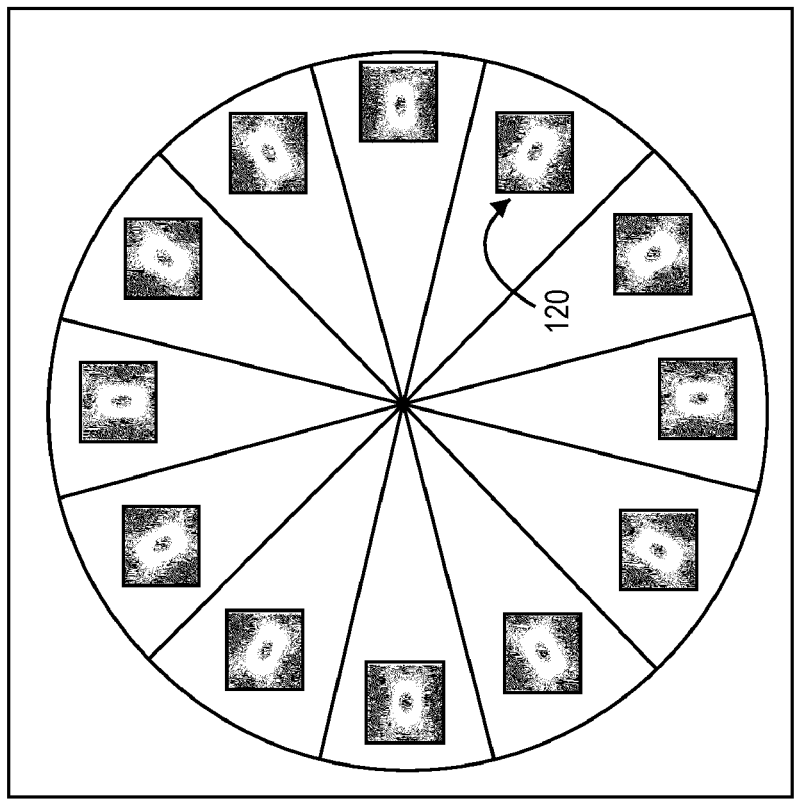
FIG. 1B illustrates MTF characteristics of an optical system having strong coma aberration.

A method and apparatus for a finite impulse response (FIR) filter bank architecture that involves low-complexity computation resources are described. In one embodiment, a digital image processing system includes an index mapping module to determine a rotation angle index to control rotation of an input patch of an image based on the (x,y) pixel coordinates of the image patch. The digital image processing system may also include a rotation module to rotate the input patch of the image based on the rotation angle index. In one embodiment, the digital image processing system may further include a filter engine module applied to a rotated version of the input patch of the image.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representation of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Figure 1A:
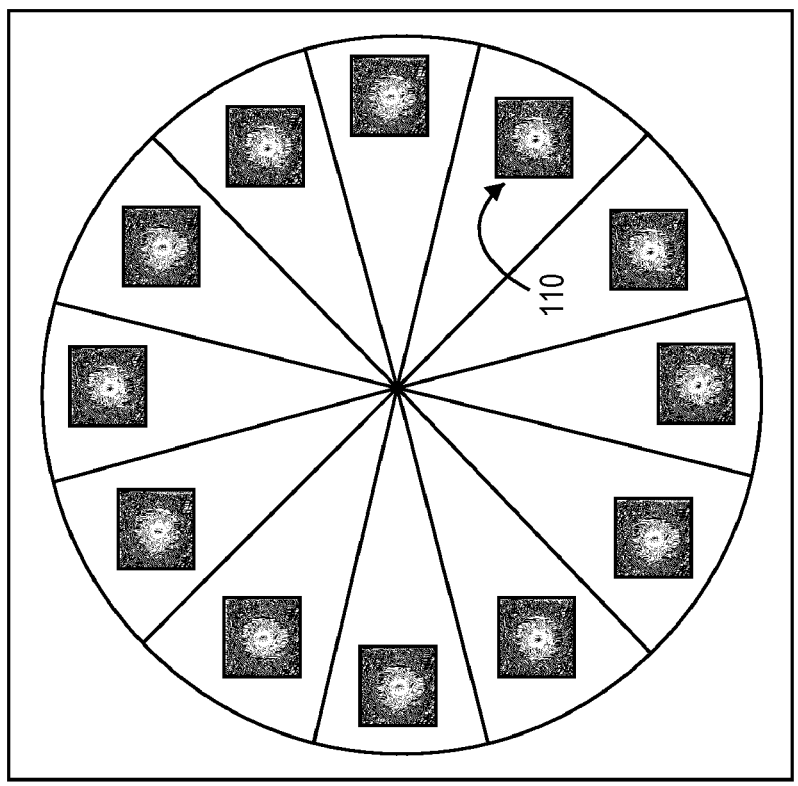
FIG. 1A illustrates modulation transfer function (MTF) characteristics of an optical system.

FIGS. 1A and 1B illustrate modulation transfer function (MTF) characteristics of different optical systems on an image. An MTF describes how much the optical subsystem blurs the image of an object. FIGS. 1A and 1B illustrate two example optical systems having different MTF characteristics. FIG. 1A illustrates the MTFsu 110 of a traditional optical system, and how an image would be blurred by the optical system. In particular, the optical aberrations are both rotationally symmetric and spatially invariant.

FIG. 1B, however, illustrates the MTFs 120 of an optical system that exhibits directional aberration properties. The MTFs 120 exhibit the orientational property with each orientation corresponding to a different location in the image field along the angular direction. That is, the MTFs 120 are both rotationally asymmetric and spatially variant due to optical aberrations.

In one embodiment, the MTFs illustrated in FIG. 1B have strong coma aberration. Furthermore, the coma aberration MTFs exhibit consistent and predictable orientation and space-varying aberration properties. In one embodiment, each orientation corresponds to a different location in the image field along the angular direction. In one embodiment, this predictable and repetitive orientation aberration property is inherent in the end-to-end designed electro-optical imaging systems described above. However, other optical systems exhibit orientation aberration properties and would equally benefit from the methods and apparatuses discussed herein.

Although FIG. 1B is illustrated showing 12 tiles for an image, each with an associated orientation varying aberration, the optical system can be divided into any number of tiles. Furthermore, because the MTF characteristics of the optical system illustrated in FIG. 1B are predictable, specialized and optimized filter architectures may be designed based on the predictable aberration properties, as will be discussed below. The predictable aberration properties are often the result of using rotationally-symmetric optical lens elements.

Figure 2A:
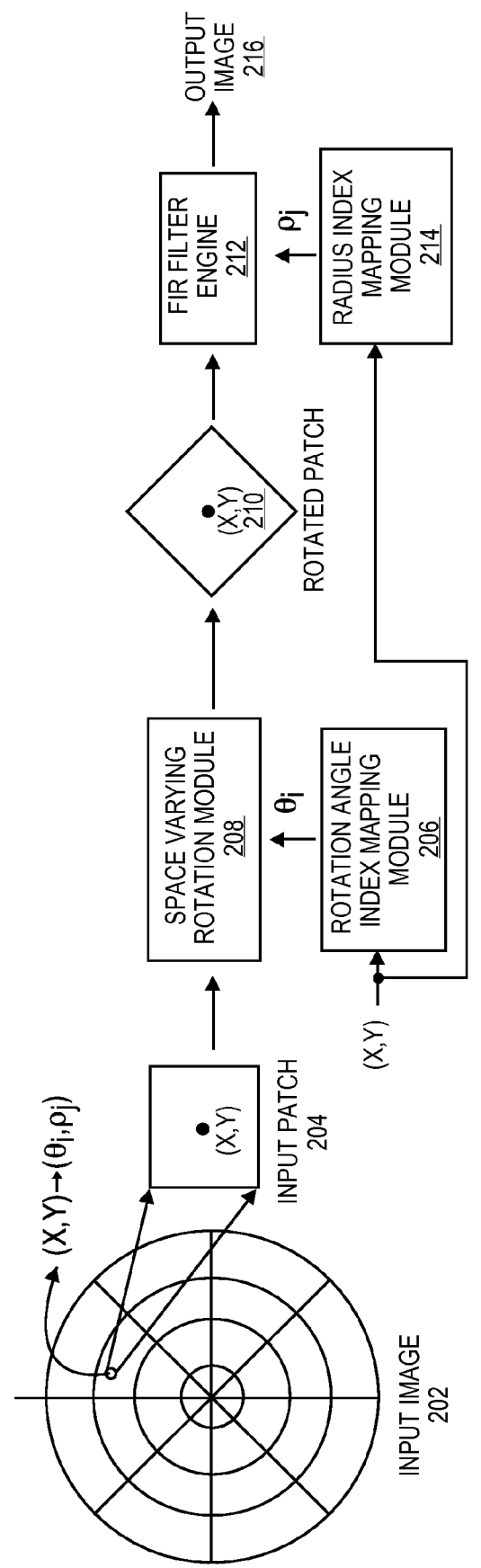
FIG. 2A illustrates one embodiment of a space-varying rotation based FIR filtering process.

FIG. 2A illustrates one embodiment of a space-varying rotation based FIR filtering process. The embodiment discussed in FIG. 2A provides a high level overview of space-varying rotation based FIR filtering process. Each element, however, is discussed in greater detail below.

In one embodiment, the sequence involves raster scanning through an input image 202. For every pixel in the input image 202, two pieces of control information are computed: a rotation angle index and a radius index. In one embodiment, the rotation angle index is used to control the amount of rotation of a small image patch 204 around the input pixel applied by the rotation module 208. After rotating the image patch 210, a FIR filter, or a set of FIR filters (i.e. a filter bank), in the FIR filter engine module 212 are applied to the input image patch 210. In one embodiment, the radius index is used to compute/control the linear weighting coefficients used to combine outputs from the set of filters in 212. The output of this combination is stored in output image 216.

The space-varying rotation based FIR filtering process illustrated in FIG. 2A may be implemented on several computing architectures. In one embodiment, the process may be implemented on a general-purpose computing architecture (CPU) or graphics processor (GPU). In another embodiment, the process may also be implemented on specialized computing devices, such as digital signal processors (DSP). In yet another embodiment, the process may be implemented using special purpose hardware designed to implement a space-varying rotation based FIR filtering system, such as field-programmable gate arrays (FPGA) or an application-specific integrated circuit (ASIC).

In one embodiment, for each input patch, such as input patch 204 of an input image, space varying rotation module 208 rotates the image patch. In one embodiment, the input image is captured by an aberrated optical system. In one embodiment, the input image 202 displays consistent and predictable orientation and space varying aberration properties, such as discussed above with respect to FIG. 1B. In one embodiment, relating the coordinates of the captured image (i.e., pixels) to the coordinate system of the optical subsystem is done either by testing the optical subsystem, or based on the optical design. The discussion below assumes the optical axis corresponds to the center of the sensor and hence the captured image. However, this need not be the case and the optical axis need not be aligned with the center of the sensor.

In one embodiment, rotation angle index mapping module 206 determines an angle by which space varying rotation module 208 will rotate image patch 204. In one embodiment, the rotation angle index is determined by rotation angle index mapping module 206 using sign detection with a set of linear functions of the point (x,y). Embodiments of sign detection are discussed in greater detail below. The results of sign detection dictate an angle $\theta_i$, from among all possible rotation angles $\theta_1 \ldots \theta_M$, for which space varying rotation module 208 can rotate the input patch. In one embodiment, a finite number of rotation angles are utilized in order to generate optimized filter coefficients for FIR filter engine module 212. In one embodiment, the filter coefficients utilized by FIR filter engine module 212 are also based on the rotation angle (i.e., FIR filter coefficients optimized for certain angles).

In one embodiment, radius index mapping module 214 determines the radius of the current input pixel location using the image center as the reference point. In one embodiment, the radius is used for determining one or more weights for linearly combining the outputs of a filter bank. In one embodiment, a finite number of the radius indices are determined according to the characteristics of a target optical system as well as the output image quality performance requirements of a target digital image processing process.

In one embodiment, space-varying rotation module 208 is a multiplexer-based architecture that is both a low-cost and high-efficiency hardware architecture. Furthermore, in one embodiment, the space-varying rotation module 208 is a scalable hardware architecture for various angles of rotation $\theta_M$ of image tiles, such as input images divisible into 8, 12, 16, etc. tiles.

Space varying rotation module 208 rotates image patch 204 by angle $\theta_i$, to create rotated patch 210. Rotated patch 210 is then supplied to FIR filter 212. In one embodiment, FIR filter 212 applies filter coefficients optimized for the particular angle $\theta_i$. The filtered and rotated patch is then output as an output image 216. In one embodiment, all patches of the input image 202 are combined to obtain a complete output image 216.

Figure 2B:
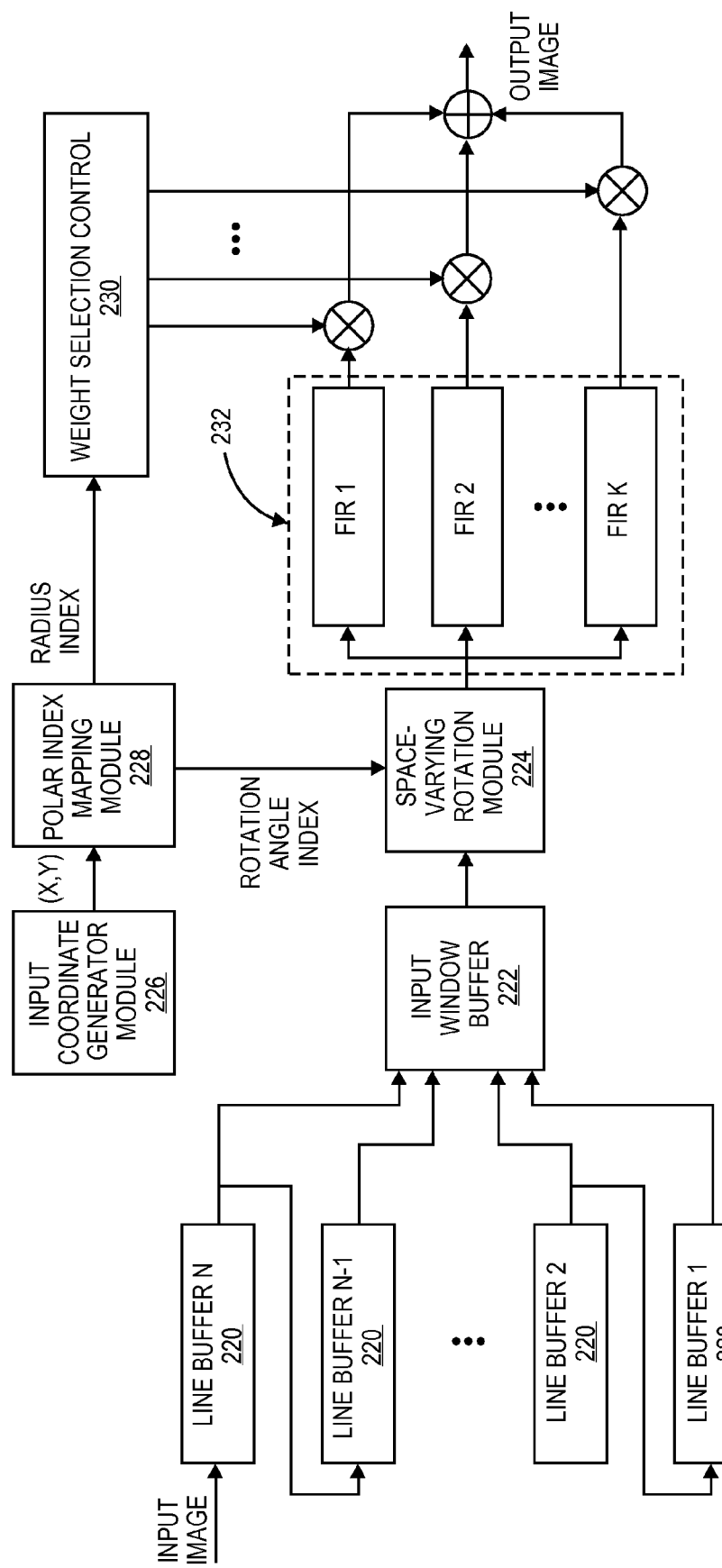
FIG. 2B illustrates one embodiment of an architecture for a space-varying rotation based two dimensional finite impulse response (FIR) filter bank.

FIG. 2B illustrates one embodiment of an architecture for a space-varying rotation based two dimensional finite impulse response (FIR) filter bank. In one embodiment, input window buffer 222 receives pixels of a window of an input image centered at the current pixel being processed. In one embodiment, the data received by input window buffer 222 is received from line buffers 220, such as line buffers 1 to N. In one embodiment, the pixels correspond to a patch of pixels from an input image, as discussed above in FIG. 2A.

In one embodiment, the space-varying rotation module 224 rotates the 2-D input window by an angle. In one embodiment, the rotation is performed by a low cost and efficient hardware structure of 2:1 multiplexers. Embodiments of the hardware structure for space varying rotation module 224 are illustrated and discussed below in FIGS. 3 and 4. In one embodiment, the rotation of the input image patch performed by space-varying rotation module 224 is determined by a rotation angle index for the current pixel. The rotated input window is then processed by the FIR filter bank 232. In one embodiment, FIR filter bank 232 consists of a finite set of FIR filters with their outputs linearly combined together using a set of weights $\alpha_i(\rho)$, where $\rho$ is the radius index of the current pixel. In one embodiment, each FIR filter of filter bank 232 can be implemented using existing 1-D FIR filter architectures such as Multiply-Accumulate (MAC) or Shift-and-Add based methods. In another embodiment, two dimensional FIR filter coefficients may be implemented using MAC or Shift-and-Add structures. In another embodiment, the FIR filters could be implemented in a serial fashion using an accumulator and control logic local to the FIR filter provided by special purpose DSP chips.

In one embodiment, weight selection control module 230 selects a different set of weights according to the current radius index received from polar index mapping module 228. Both the rotation angle index and radius index are computed by the polar index mapping module 228 from the current pixel coordinate (x,y). In one embodiment, the current pixel coordinate is generated by the input coordinate generator module 226.

Figure 2C:
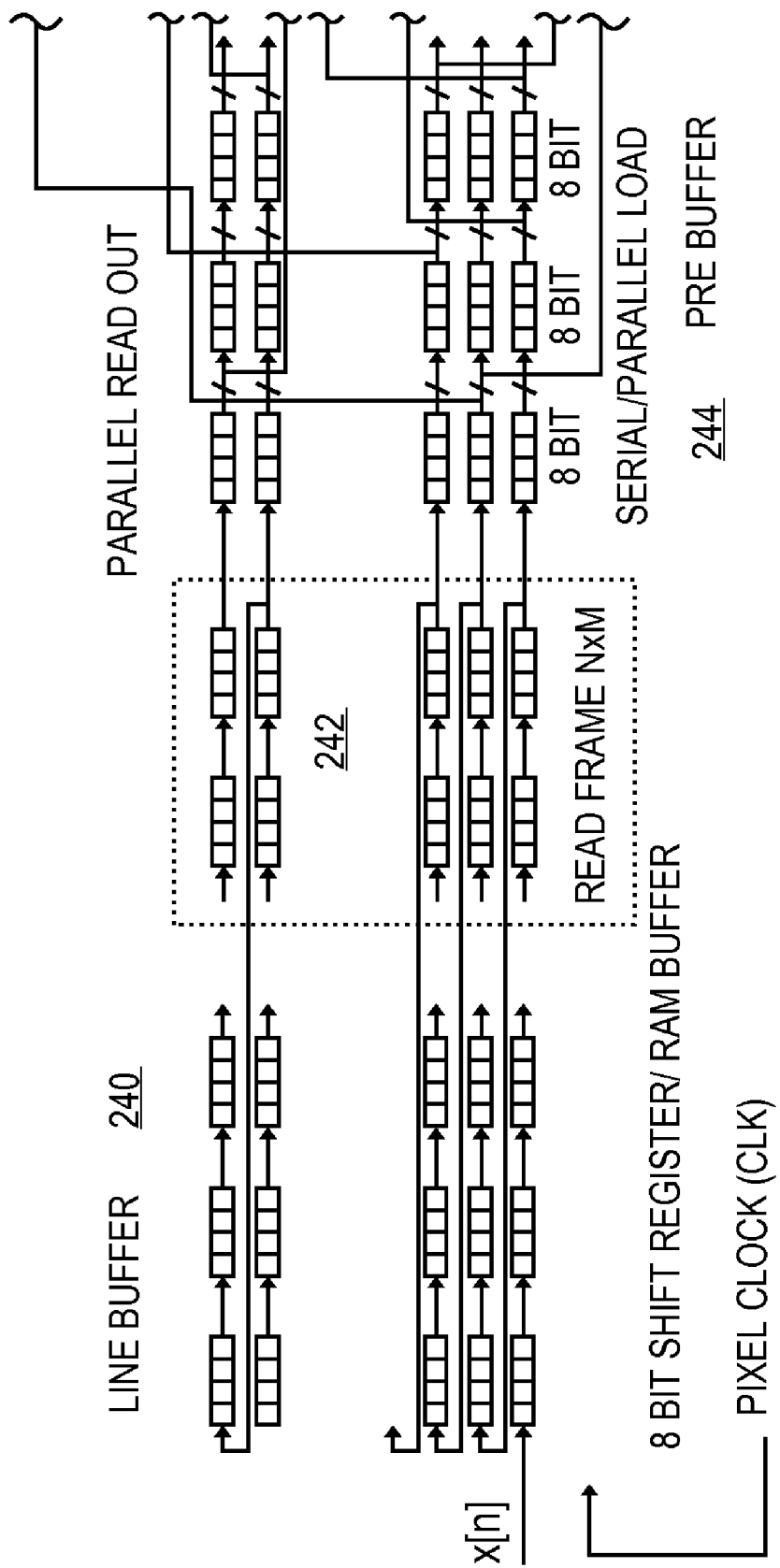
FIG. 2C illustrates one embodiment of an architecture for a space-varying rotation based two dimensional FIR filter bank.
Figure 2C:
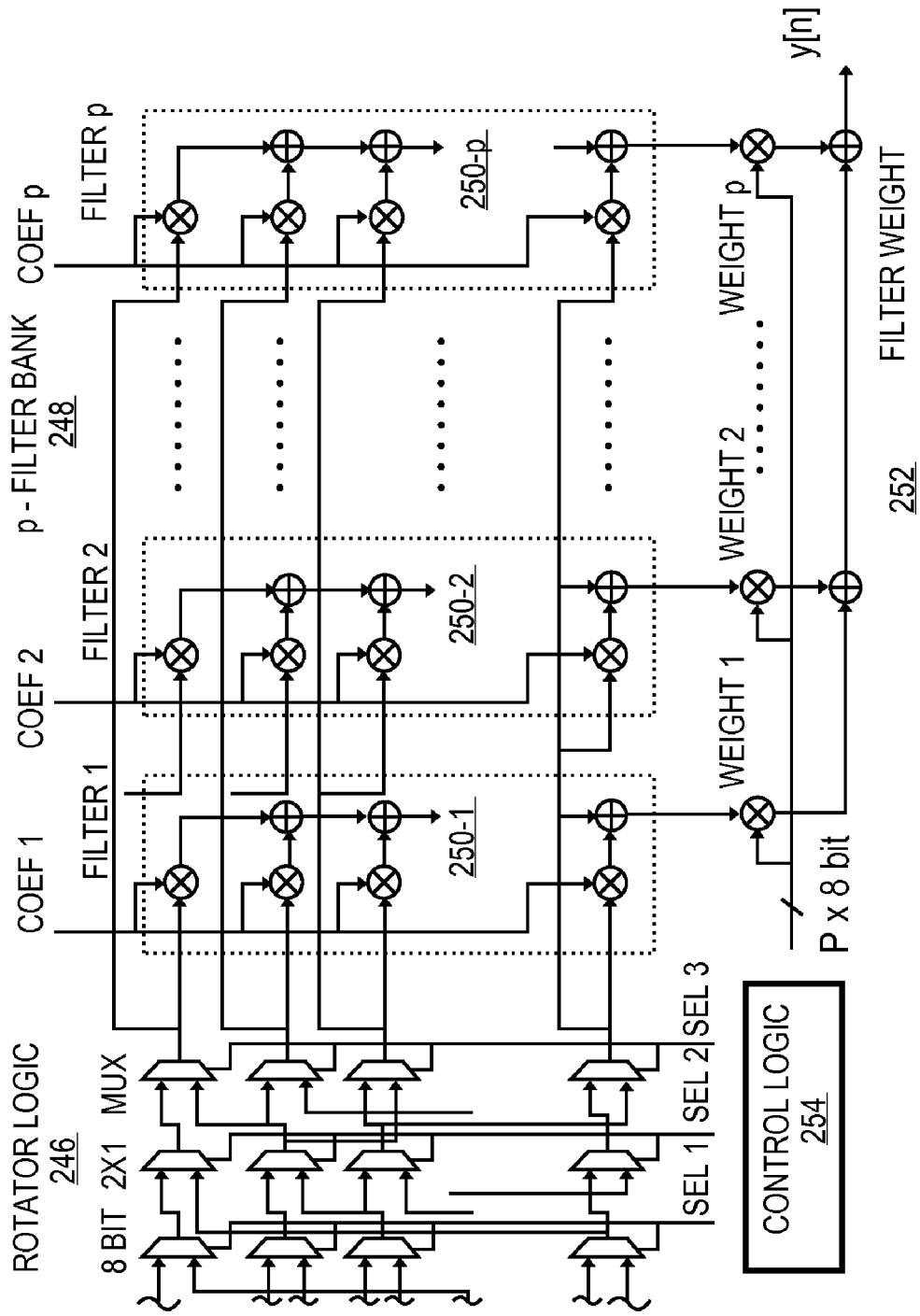

FIG. 2C illustrates one embodiment of an architecture for a space-varying rotation based two dimensional FIR filter bank. In the filter bank illustrated in FIG. 2C, one embodiment of logic level details are illustrated. FIG. 2C illustrates one embodiment of a hardware based configuration of the architecture discussed above in FIG. 2B.

In one embodiment, the architecture for a rotating two dimensional FIR filter includes line buffer 240. In one embodiment, line buffer 240 incorporates the use of synchronous serial in, serial out shift registers. In another embodiment, line buffers 240 incorporate the use of dedicated RAMs (e.g. block-RAMs on Xilinx FPGAs) with a counter to address memory. Furthermore, in one embodiment, the RAMs are read first RAMs.

In one embodiment, line buffer 240 includes frame buffer 242. In one embodiment, frame buffer 242 is a virtually defined frame of pixels equal to $F_h \times F_w$ where $F_h$ and $F_w$ are the height and width of the frame respectively. These are determined as $\sqrt{2} \max (f_{h1}, f_{h2}, \ldots f_{hp}, f_{w1}, f_{w2} \ldots f_{wp})$, where $f_{hi}$ and $f_{wi}$ are the heights and widths respectively of the $i^{th}$ filter in the p-Filter Bank 248. In one embodiment, the number of bits for $F_h$ and $F_w$ are chosen at a time they are to be processed by the rotator. The number of bits is also provided to the p-filter bank 248 with the relevant bits for the pixel to be filtered by the two dimensional FIR filter.

In one embodiment, pre-buffer 244 receives pixel data from line buffer 240. In one embodiment, pre-buffer 244 includes parallel-in-parallel-out registers. Furthermore, in one embodiment, the parallel-in-parallel-out registers are look up tables (LUTs) or other equivalent elements.

Pixel data is then provided from pre-buffer 244 to rotator logic 246. In one embodiment, rotator logic includes a set of multiplexers with a predefined connection mapping between the multiplexers in the set. Furthermore, the predefined connection mapping enables pixel selection for filtering from the virtually defined frame 242. One embodiment of the set of multiplexers, with predefined connection mappings, for rotator logic 246 is discussed below with respect to FIG. 4. Furthermore, as discussed herein, the rotator logic 246 by connection mapping pre-rotates image data to be filtered by p-filter bank 248.

In one embodiment, p-filter bank 248 receives the rotated image data from rotator logic 246. In one embodiment, p-filter bank 248 consists of a set of filters, such as filter 250-1 through filter 250-p. Filters 250 can be various types of filters. For example, filters 250 can be MAC, Distributed Arithmetic (DA), or Shift-and-Add filters. Other FIR filter architectures may be utilized consistent with the discussion herein.

In one embodiment, control logic 254 determines the rotation that rotator logic 246 will apply to a given pixel before the pixel data is filtered. Furthermore, control logic 254 assigns weights to the filtered outputs of p-filter bank 248, and provides these weights to filter weight 252. In one embodiment, the weights are assigned in real time based on a radial tile to which a pixel belongs.

In one embodiment, filtered data from p-filter bank 248 is further weighted by filter weight 252. In one embodiment, filter weight 252 weights outputs of the p-filter bank 248 with predefined weights. In one embodiment, the weights are determined from control logic 254 based on a radial tile to which the current pixel being filtered belongs. Radial tiles and pixel weighting is discussed in greater detail below. Filter weight 252 then outputs the filtered and weighted pixel data as the final system output.

FIG. 3A illustrates one embodiment of an architecture for space-varying rotation using a rotation control index for rotating input image data. FIG. 3A illustrates the rotation index mapping structure. The structure consists of three stages of binary multiplexers (e.g., binary multiplexers 310, 320, and 330), where the output of each stage switches between the zero degree input and the rotated value with the corresponding rotating angle. In one embodiment, each multiplexer is controlled by input of a control bit of the corresponding rotating angle. In one embodiment, the three-stage rotating index mapping structure illustrated in FIG. 3A can be used for 8 rotating angles, namely 0, 45, 90, 135, 180, 225, 270, and 315 degrees, according to the 3-bit control byte.

For example, FIG. 3B illustrates a 3-bit rotating control index for rotating image data 135 degrees. The rotating control index created from the rotating angle generator is 110 in binary, where each bit from the MSB to LSB controls the 45, 90, and 180 degree multiplexers, separately. In this case, the 45 and 90 degree multiplexers are enabled by the 1 bit inputs into the respective multiplexers. Furthermore, the 180 degree multiplexer is disabled by the 0 bit input. The result is rotation of image data from both the 45 and 90 degree multiplexers, therefore producing a 135 degree rotation at the output. The 8 rotating angles, 0, 45, 90, 135, 180, 225, 270, and 315 degrees, may similarly be generated based on selectively operating each binary multiplexer.

In one embodiment, the connection mapping for the multiplexer inputs is generated using the nearest neighbor method. In one embodiment, the space-varying rotation structure is based on the nearest neighbor interpolation algorithm for image rotation. The effect of the interpolation error on the filtering result varies with the rotation angles. In one embodiment, the rotation structure may include local interpolation (i.e., bilinear, bi-cubic, etc.) to improve the quality of the rotated image patch for larger patches.

Figure 4:
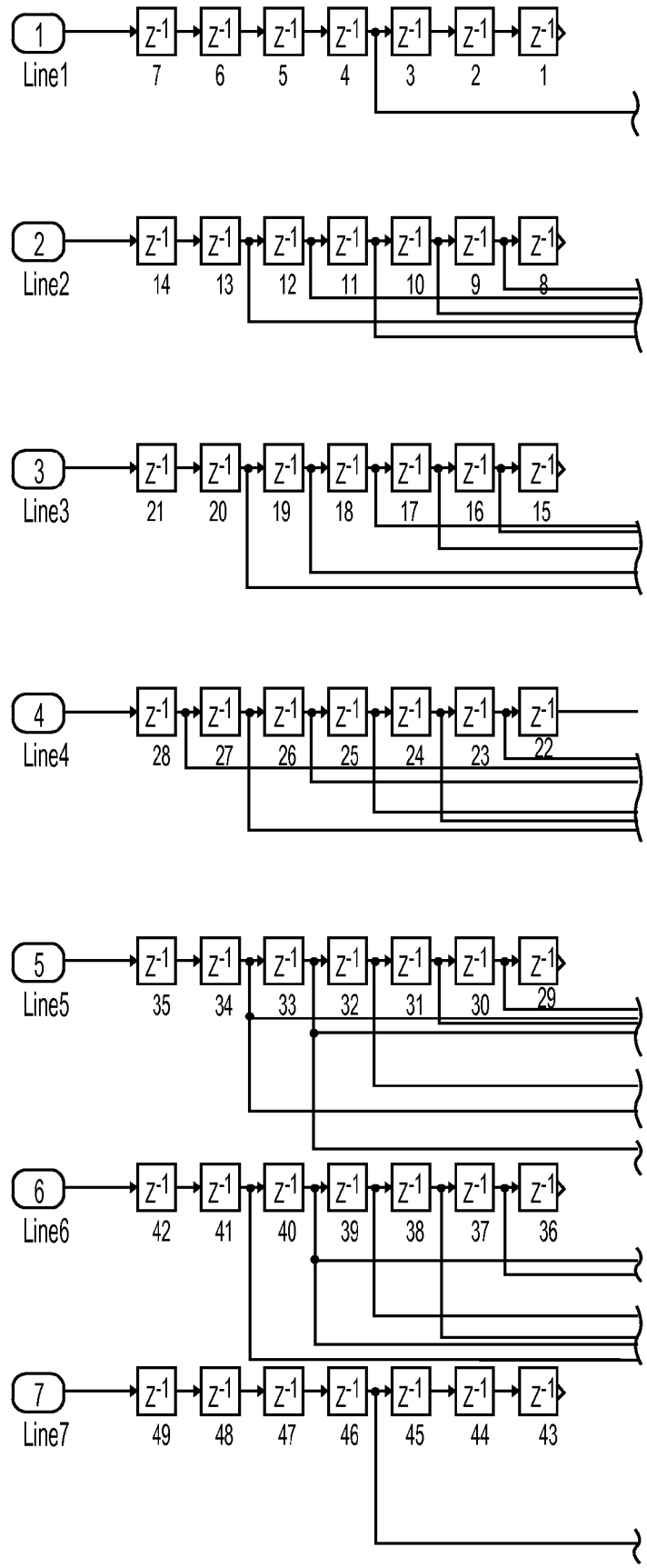
FIG. 4 illustrates one embodiment of a field-programmable gate array (FPGA) rotating index mapping structure utilizing multiplexers.
Figure 4:
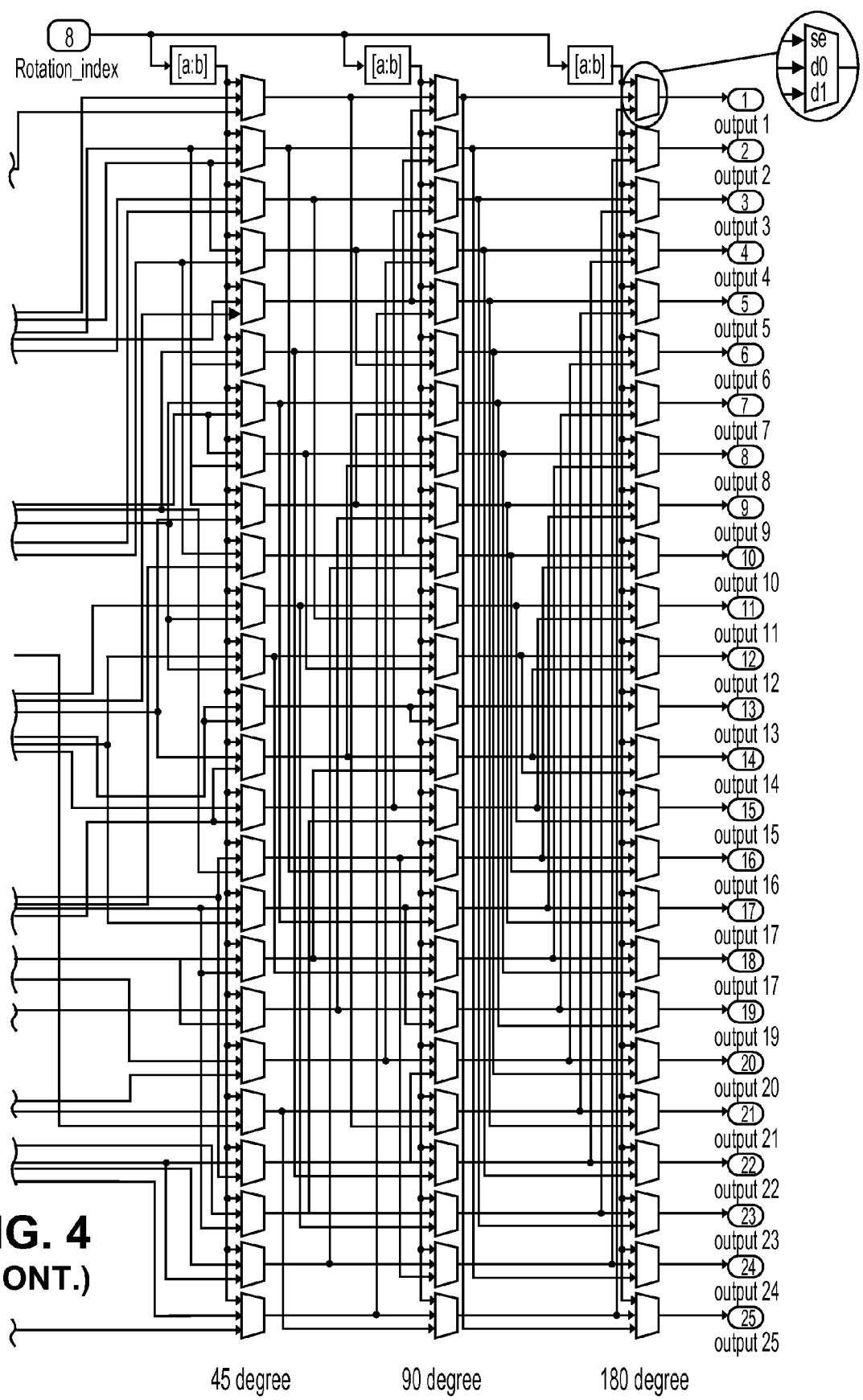

FIG. 4 illustrates one embodiment of a field-programmable gate array (FPGA) rotating index mapping structure utilizing multiplexers. In one embodiment, the rotating index mapping structure uses 3-stages of multiplexers. In one embodiment, the 3 stages of multiplexers correspond to 45, 90, and 180 degrees of rotation. Furthermore, the rotating index mapping structure has 25 outputs, corresponding to a 5×5 2-D filter kernel size. Although the illustrated rotating index mapping structure operates on a 5×5 2-D filter kernel, other sizes of filter kernel can also be processed with architectures consistent with the discussion herein. In one embodiment, the rotating index mapping also includes a 2-D input window buffer, which consists of an array of registers with the size of 7×7, where 7 is approximately the times of the filter kernel size 5.

Although the rotating index mapping structure that operates on a 5×5 2-D filter kernel is illustrated in FIG. 4, with 3 stages of rotation, other combinations are possible. Given a finite set of M angles to be rotated, $\theta = \{\theta_1, \theta_2, \ldots, \theta_M\}$, input $2N^2$ pixels and $N^2$ output pixels, a minimum number of 2:1 multiplexers are needed for each output of the rotating index mapping structure is $O(\log_2 M)$. For example, and as illustrated above in FIG. 4, for 8 angles, 3 stages of 2:1 multiplexers are utilized for each output of the rotating index mapping structure. Similar structures may also be applied in other hardware systems, such as an ASIC.

Figure 5A:
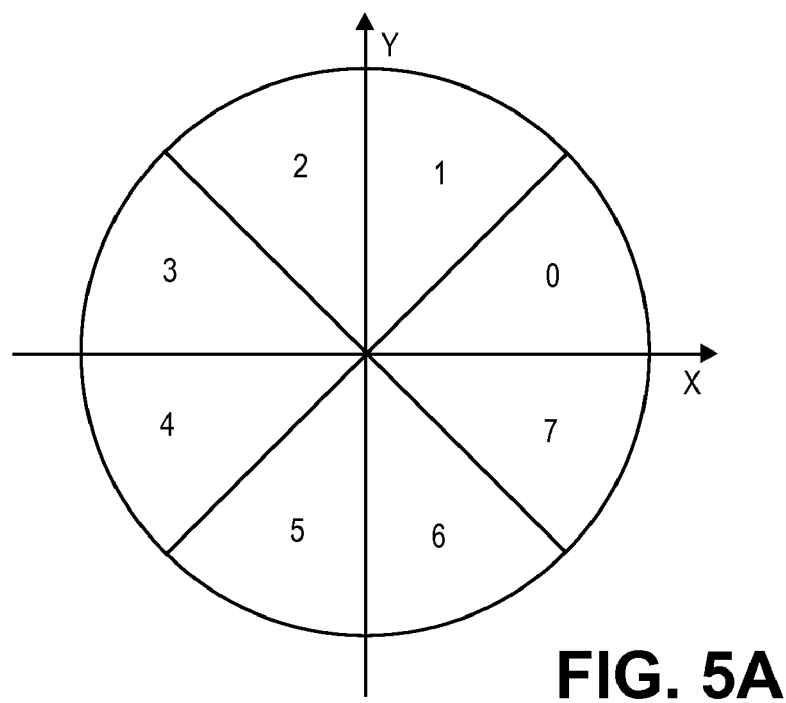
FIG. 5A illustrates an example for segmenting an image to be processed with 8 angular tiles.
Figure 5B:
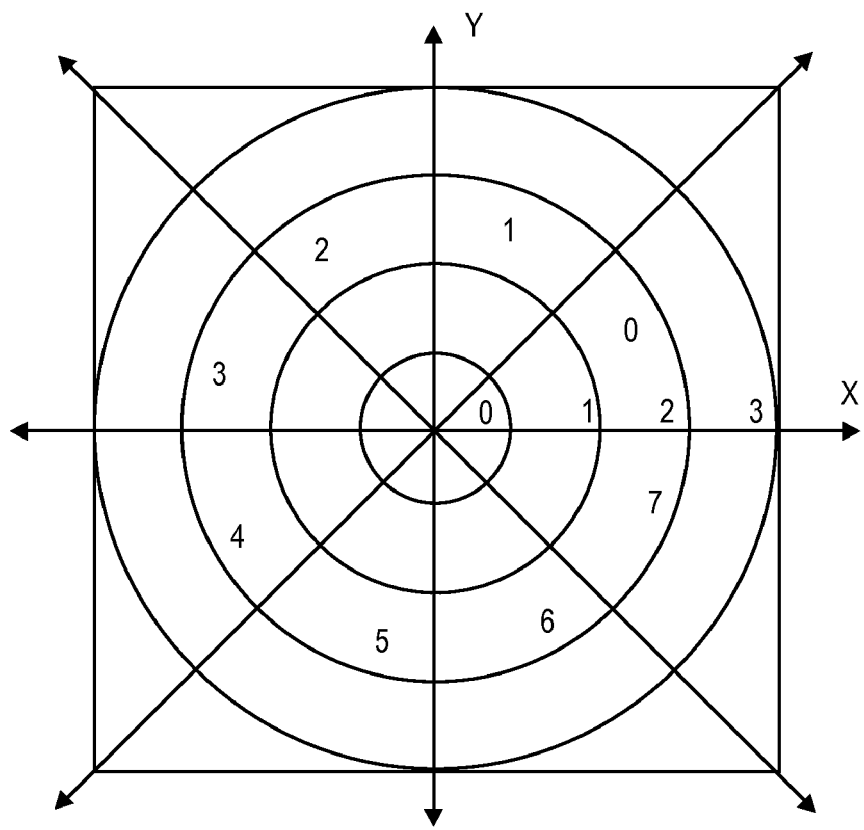
FIG. 5B illustrates an example for segmenting an image to be processed with 4 radial tiles and 8 angular tiles.

FIG. 5A illustrates an example for segmenting an image to be processed with 8 angular tiles. FIG. 5B illustrates an example for segmenting an image to be processed with 4 radial tiles and 8 angular tiles. Each tile covers 45 degrees of an input image, and the corresponding index for each tile ranges from 0 to 7. Thus, in one embodiment, 3 control bits (000-111 in binary) are utilized for generating a rotation angle index for the three-stage multiplexers illustrated in FIGS. 3A and 3B.

Rotation angle index mapping can be implemented by computing the arctan value for each pair of coordinates (x,y) for an input image. In other embodiments, the rotation angle index mapping function can be implemented with less cost by using sign detection for a set of linear functions of x and y. One embodiment for generating the 3 control bits is provided in the pseudo-code below:

```
if x > 0 and y > 0 then
    if x - y > 0 then
        angle_index = 0
    else
        angle_index = 1
else if x < 0 and y > 0 then
    if x + y > 0 then
        angle_index = 2
    else
        angle_index = 3
else if x < 0 and y < 0 then
    if x - y > 0 then
        angle_index = 4
    else
        angle_index = 5
else
    if x + y < 0 then
        angle_index = 6
    else
        angle_index = 7
end
```

In one embodiment, the sign detection technique for rotation angle index mapping differs according to the total numbers of angular tiles of in input image to be rotated. Three examples of sign detection for rotation angle index mapping for 8, 12, and 16 tiles are provided below:

8 angular tiles, 45 degree for each tile:

$f_1(x,y) = y - x$ $f_2(x,y) = y + x$ 12 angular tiles, 30 degree for each tile:

$f_1(x,y) = y - x/2 - x/16 - x/64$ $f_2(x,y) = y - 2x + x/4 + x/64 + x/512$ $f_3(x,y) = y + 2x - x/4 - x/64 - x/512$ $f_4(x,y) = y + x/2 + x/16 + x/64$ 16 angular tiles, 22.5 degree for each tile:

$f_1(x,y) = y - x/2 + x/8 - x/32 - x/128$ $f_2(x,y) = y - x$ $f_3(x,y) = y - 2x + x/16 + x/64$ $f_4(x,y) = y + 2x + x/2 - x/8 + x/32 + x/128$ $f_5(x,y) = y + x$ $f_6(x,y) = y + x/2 - x/8 + x/32 + x/128$

Each example above includes the linear functions of x and y that are used for the different embodiments of sign detection. Note that the origin of the (x, y) coordinates is defined to be the center of the input image. Table 1 shows the select signal values based on the sign bits of the linear functions and the coordinates for an example case of the space-varying rotation index mapping for 12 angular tiles:

TABLE 1

| $f_1$ | $f_2$ | $f_3$ | $f_4$ | x | y | Tile |
|---|---|---|---|---|---|---|
| 1 | 1 | 0 | 0 | 0 | 0 | 1 |
| 0 | 1 | 0 | 0 | 0 | 0 | 2 |
| 0 | 0 | 0 | 0 | 0 | 0 | 3 |
| 0 | 0 | 0 | 0 | 1 | 0 | 4 |
| 0 | 0 | 1 | 0 | 1 | 0 | 5 |
| 0 | 0 | 1 | 1 | 1 | 0 | 6 |
| 0 | 0 | 1 | 1 | 1 | 1 | 7 |
| 1 | 0 | 1 | 1 | 1 | 1 | 8 |
| 1 | 1 | 1 | 1 | 1 | 1 | 9 |
| 1 | 1 | 1 | 1 | 0 | 1 | 10 |
| 1 | 1 | 0 | 1 | 0 | 1 | 11 |
| 1 | 1 | 1 | 0 | 0 | 1 | 12 |

In one embodiment, the selection and use of the linear functions, discussed above, is made to facilitate hardware simplicity. In one embodiment, multiples of two are used as scaling constants to x and y to approximate the arctan function, the computations of which would otherwise involve a hardware intensive division.

Figure 6:
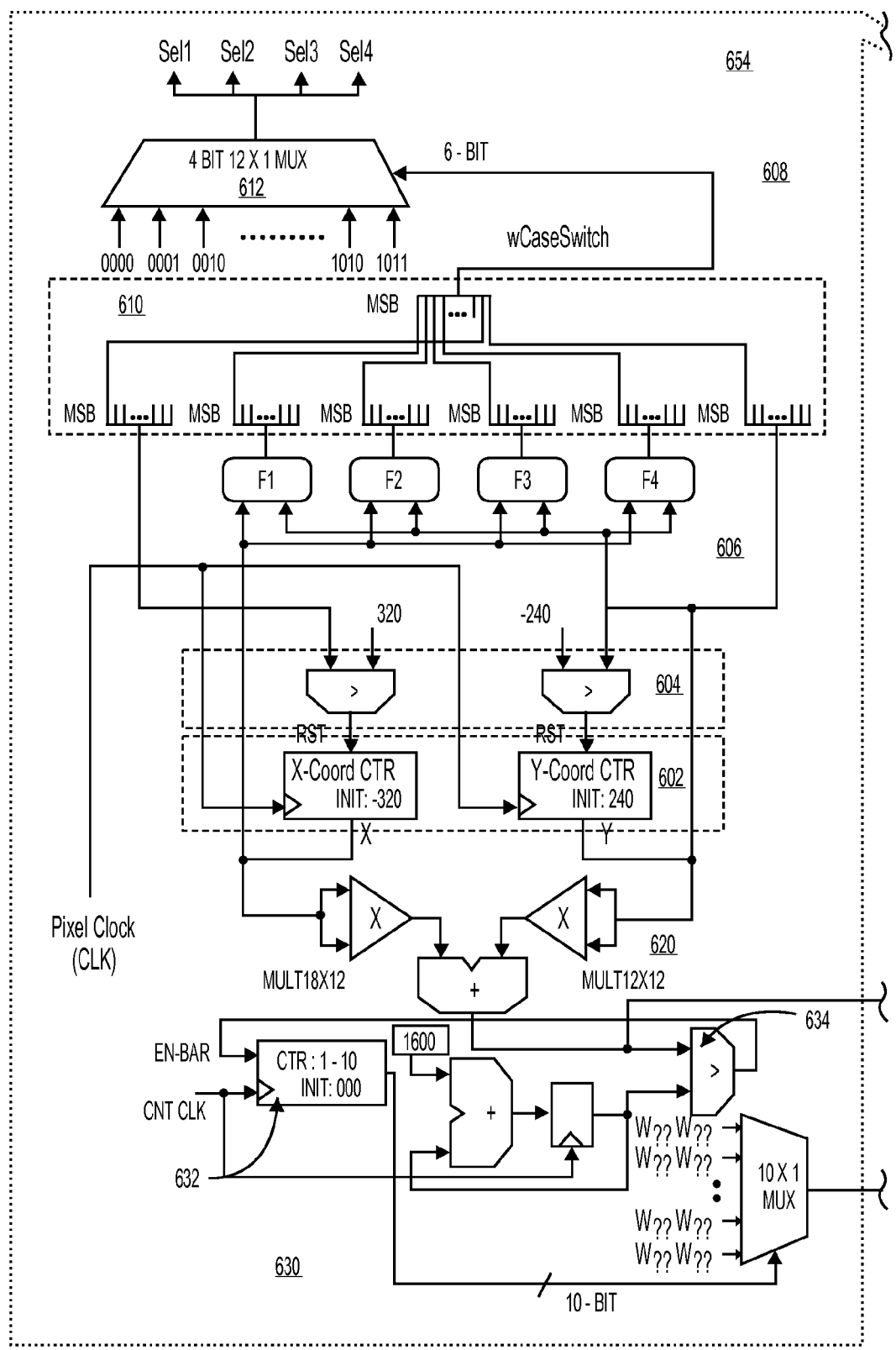
FIG. 6 illustrates one embodiment of a control logic for the space-varying rotation based FIR filter bank architecture.
Figure 6:
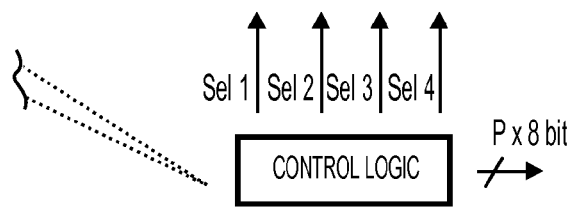
Figure 6:
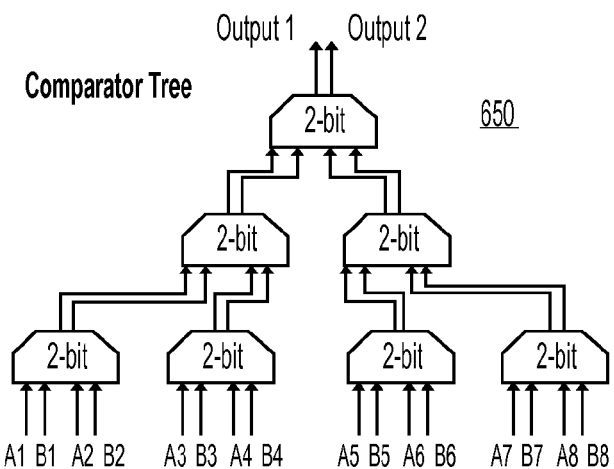
Figure 6:
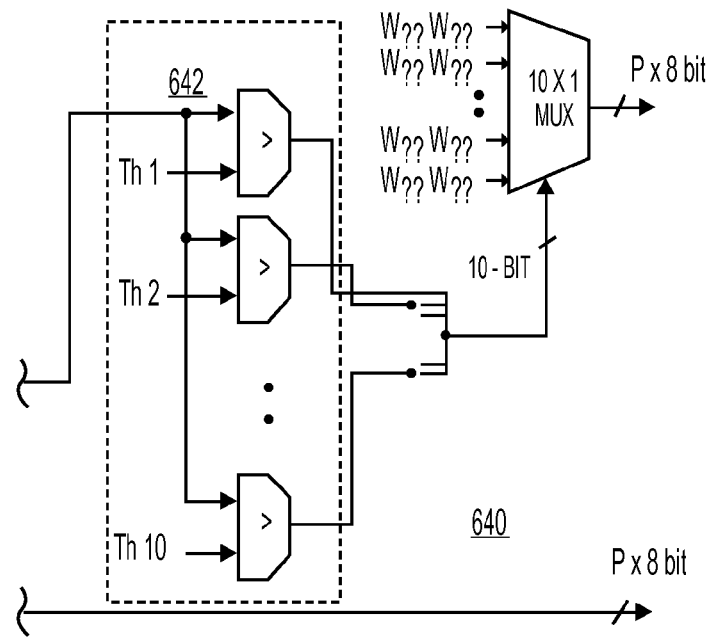

FIG. 6 illustrates one embodiment of a control logic for the space-varying rotation based FIR filter bank architecture. In one embodiment, controller 654 generates select signals for a multiplexer rotator, and weights to be assigned to a filter bank based on a radial tile, as discussed above. The controller 654 illustrated in FIG. 6 provides additional details for control logic 254 of FIG. 2C.

Pixels start arriving in a raster fashion from the top left corner of the image. For ease of computation, the coordinate axis needs to be shifted to the center of the image. In one embodiment, counters 602 enable shifting of the coordinate axis. In one embodiment, counters 602 are reset by comparators 604, which compare x and y coordinate values.

For example, where an image is composed of 640×480 pixels, counters 602, illustrated as X-Coord CNTR and Y-Coord CNTR, are set to −320 and 240 respectively. The reset values of −320 and 240 respectively for X and Y counters are determined by the boundaries of the 640×480 pixel image with the center coordinate at (0, 0). In one embodiment, the counters are 10 bit counters, which count numbers in the 2s complement form. Continuing the example, for counters set to −320 and 240, the counters are initialized with values 1110110000000 and 0000111110000, which correspond to −320 and 240 in 2s complement form. Therefore, in one embodiment, to track the counting, the X-coordinate counter is incremented by 1 and the Y-coordinate counter is decremented by 1 each time a new pixel data is analyzed.

In one embodiment, counters 602 output the X and Y coordinate values that are to be utilized to determine the select signals for the multiplexer rotation network, as well as the weights for the filter bank.

In one embodiment, linear function network 606 is illustrated above the comparators 604 and counters 602. In one embodiment, linear function network 606 implements the linear functions for sign detection discussed above. For example, the linear functions implemented by linear function network 606 could be ($f_1$, $f_2$) for a 45 degree tiling, ($f_1$, $f_2$, $f_3$, $f_4$) for a 30 degree tiling, or ($f_1$, $f_2$, $f_3$, $f_4$, $f_5$, $f_6$) for a 22.5 degree tiling. As discussed above, the functions are linear functions of X and Y coordinates. In one embodiment, the linear functions involve shift operations on the X and Y coordinates. For example, for an optics system with 16 tiles and 22.5 degree angular partitioning, the function $f_1$ is evaluated by linear function network 606 as:

$$F1 = Y + \sim \{X(11), X(11:1)\} + \{X(11), X(11), X(11), X(11:3)\} + \sim$$
$$\{X(11), X(11), X(11), X(11), X(11), X(11:5)\} + \sim$$
$$\{X(11), X(11), X(11), X(11), X(11), X(11), X(11), X(11:7)\} +$$
$$12'b00000000011$$

Where "~" is the operation of inversion, "{ }" is the operation of bit concatenation and X(i) denotes the bit at the $i^{th}$ position in the N-bit coordinate string X In one embodiment, the function is based on sign extended shifting. Furthermore, the sign extension is incorporated by extending the sign bit of X and Y while performing the shift operation. For negation, a bit flip is performed followed by an addition of the constant 1 which leads to generating the 2s complement of the number.

In one embodiment, rotation index 608 receives the result of the linear function network 606. In one embodiment, rotation index block 608 contains multiplexer 612 and most significant bit (MSB) rearrangement nets 610. As discussed above, the outputs of the linear functions are used to identify the angular position of a pixel. In one embodiment, angular mapping is achieved by using only the MSB of the linear function blocks, because the MSB outputs of the linear functions are signed bits for the 2s complement numbers.

In one embodiment, multiplexer 612 of rotation index 608 is an embedded multiplexer of an FPGA. For example, multiplexer 612 may be a BUFGMUX embedded on a XILINX™ FPGA or a similar design in an ASIC, CPU, GPU, DSP or any other computing platform. In one embodiment, multiplexer 612 chooses between select signals that are assigned as inputs. The inputs (e.g., selection signals) assigned to multiplexer 612 vary in size based on the rotation angles possible for an optical system (e.g., 8, 12, or 16 angular tiles). Furthermore, the number of multiplexers also varies based on possible rotation angles. For example, for 8 angular tiles, three multiplexers are utilized for selection of 45, 90 and 180 degree angles of rotation. For 12 and 16 angular tiles, 4 multiplexers are utilized for selection of 30, 60, 120, and 240, and 22.5, 45, 90 and 180 degree angles of rotation respectively. The select inputs for the multiplexer are the sign bits from the outputs of 606 and the X-Y coordinates. In one embodiment, the multiplexer mapping is performed using a table similar to Table 1 discussed above.

In one embodiment, controller 654 further includes radius square $(\rho^2)$ generator 620. In one embodiment, the sum of coordinates outputs the radius square value $\rho^2 = X^2 + Y^2$. In one embodiment, the radius square generator 620 is configured using hardware multipliers.

In one embodiment, controller 654 includes weight selector and radial tile assigner 630. Controller 654 may also include an alternate weight selector and radial tile assigner 640. Each of weight selector and radial tile assigner 630 and 640 perform polar assignment and weight selection in different ways.

Weight selector and radial tile assigner 630 is illustrated for an embodiment directed at an image frame size of 640×480. The image frame size is provided for illustrative purposes, as a weight selector and radial tile assigner 630 may be configured for various image frame sizes consistent with the discussion herein. For a frame size of 640×480, the maximal radius is $400 = \sqrt{240^2 + 320^2}$. Assuming a tiling quantization of 10 tiles in the image frame, the nine tile thresholds are $40^2$, $80^2$, $120^2$, $160^2$, $200^2$, $240^2$, $280^2$, $320^2$, and $360^2$. Thus, if the radius of a given pixel has a value below $40^2$, it lies in tile 1 of the image frame, which has a set of pre-assigned weights. In one embodiment, the weights are pre-determined using the polynomial function described above. In one embodiment, if the radius of a given pixel is between $40^2$ and $80^2$, the pixel belongs to tile 2 and so forth.

In one embodiment, to enable radial tile assignment, a counter 632 is utilized that counts up to 10 (e.g., the radial tile resolution) and an accumulator 634 whose output is compared against the value of $\rho^2$. The accumulator 634 accumulates 1600 (the minimum tile threshold), and the output of the comparator 620 disables the counter 632 when the tile has been determined. If the current $\rho^2$ is less than the threshold, however, it lies in the tile number determined by the counter. In one embodiment, a pixel clock and a counter clock are utilized by controller 654. The output of counter 632 (i.e., a polar number) is used as a select input to a multiplexer fed with the weights to be assigned to the filter bank. For weights being 8 bits, then each multiplexer input is 16 bits.

In one embodiment, weight selector and radial tile assigner 640 parallelizes the process of weight selection and radial tile assignment. In this embodiment, $\rho^2$ is directly sent to a set of comparators 642. In one embodiment, comparators 642 are 10 bits each, and compared with the thresholds (in steps of 1600 for the example with an image of size 640×480). In one embodiment, the output of comparators 642 is used as a select signal for a multiplexer whose inputs are connected to the values of the weights corresponding to the given radial tiles.

In one embodiment, comparators 642 and comparators 604 are configured as a tree of 2-bit comparators. When the comparators are configured in tree form, the comparator data processing speed is maximized. One embodiment of comparators 642 and comparators 604 in the form of a tree of 2-bit comparators is illustrated by block 650.

In one embodiment, described above in FIG. 2C, dedicated RAM (e.g. a block-RAM in a XILINX™ FPGA) are utilized for line buffers, and Look up tables (LUTs) or equivalent logic or circuit elements are utilized for the rotation multiplexer network, the pre-buffers, and the control logic. In other embodiments, ASIC, CPU, GPU, DSP or other computational components can be used for implementation. In one embodiment, the FIR filters use 50 multipliers and 49 adders for a 5×5 two MAC filter bank. An alternative embodiment could use Distributed Arithmetic (DA) filters or Add-and-Shift filters with better hardware efficiency.

Figure 7:
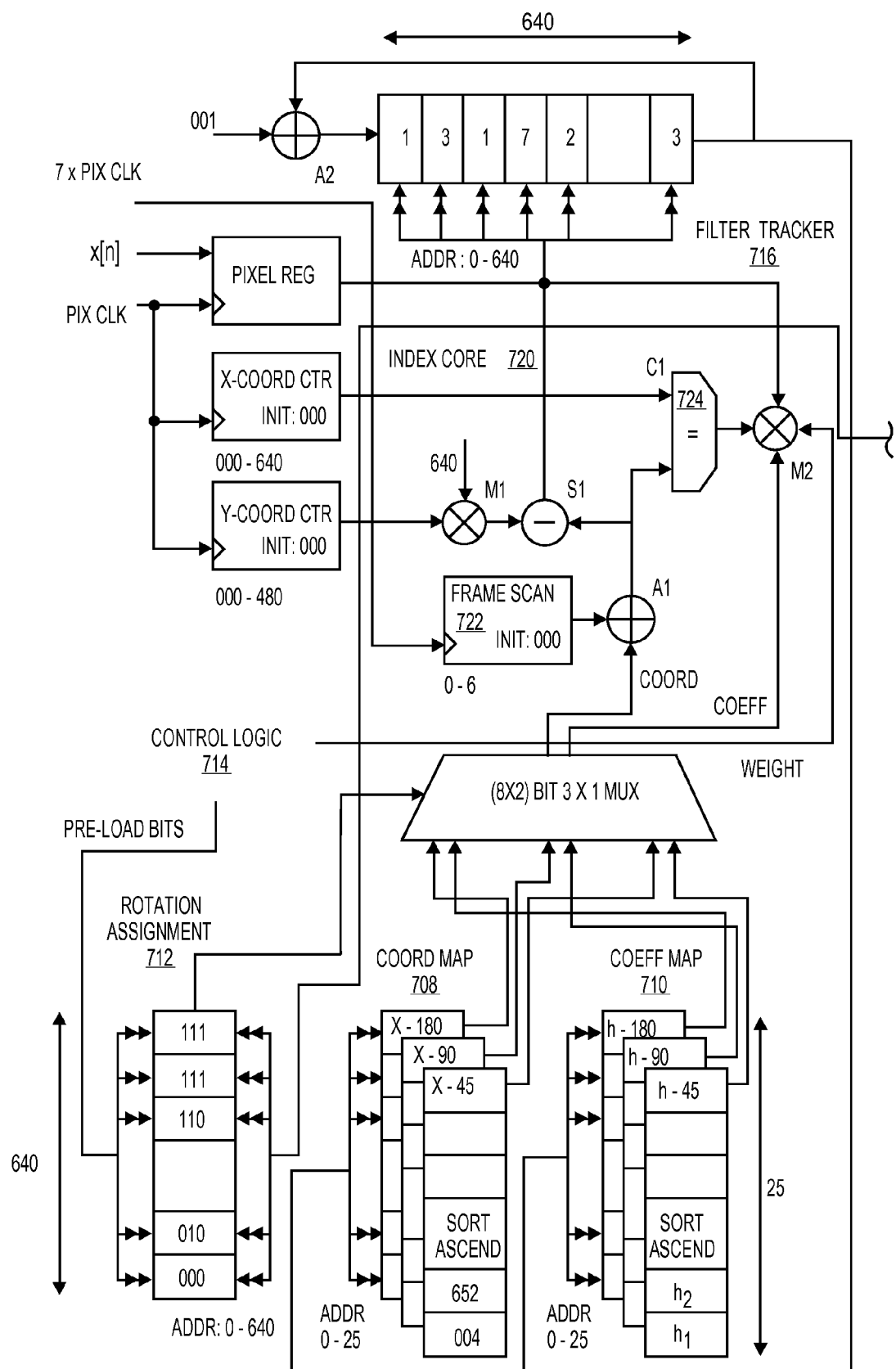
FIG. 7 illustrates one embodiment of an architecture for a serial space-varying rotation based two dimensional FIR filter bank.

FIG. 7 illustrates one embodiment of an architecture for a serial space-varying rotation based two dimensional FIR filter bank.

An exemplary 640×480 frame 702 is illustrated. Assuming the pixel being filtered is pixel 706-1, in one embodiment, the computation in the serial embodiment of FIG. 7 for pixel 706-1 is not complete until the last pixel in the virtual frame arrives. In one embodiment, the computation of the filtering operation is started as soon as pixel 704 arrives. In one embodiment, pixel 704 is used in the computation of the partial sums of the filtering operation for the pixels in frame 702 (i.e., a virtual frame).

In FIG. 7, Coeff Map 710 and Coord Map 708 are memories which hold the awaited X coordinate values (of the pixel needed for a filtering operation) sorted in an ascending order. These are determined based on a rotation mapping pre-defined using the pixel angles (Eg. 45, 90 or 180 deg), and the filter coefficients corresponding to these awaited coefficients are stored in a Coord Mmap stack. In one embodiment, Coeff Map 710 and Coord Map 708 can also hold the Y-coordinate values. These can be calculated before the frame processing starts, and memory instantiated for all the current horizontal line pixels being processed (i.e., pixels 706-1 to 706-*i*—640 in number for the example case). In one embodiment, control logic 714 determines the rotation angle assignment with the rotation assignment logic 712. The rotation angle is determined for pixels 262-1 to 262-*i* in image 702 and corresponding select signals are stored in a memory before starting the filtering process on pixel 262-1. In one embodiment, control logic 274 further selects weight(s) for the filtering operation. Control logic 714 has a similar architecture as the control logic discussed above in FIG. 6.

In one embodiment, filter tracker 716 tracks the number of 2D-filter multiplications completed for a current pixel in the horizontal line under process. In one embodiment, filter tracker is a buffer. Furthermore, a new memory of filter tracker 716 is instantiated for each new horizontal line of pixels in frame 702.

In one embodiment, output buffer 718 accumulates the computation of the filter multiplications for a current arriving pixel. In one embodiment, this is computed for all pixels in a horizontal row when a new pixel arrives (e.g., such as when pixel 704 arrives). In one embodiment, the number of output buffers is equal to the number of input buffers. For example, in a 7×7 filter, in order to finish computation for a pixel, 49 pixels around it have to arrive.

In one embodiment, the contents of the output buffers are accumulated as soon as a pixel needed for the filtering operation arrives (e.g., pixel 704 in the example above). In one embodiment, this stored computation for a current pixel could be used to approximate the filtering operation for a pixel in the next line. In one embodiment, this methodology is useful in images with a high vertical line pixel correlation. Thus, in such applications, the approximation error may not be very high, and fewer output buffers would be utilized.

In one embodiment, index core 720 performs serial filtering operations on pixel data. In one embodiment, index core 720 includes frame scan counter 722. For a 7×7 frame, index core 720 would run at 7 times a pixel clock frequency where 7 is max ($F_h$, $F_w$). This is because a current arriving pixel (e.g., pixel 704) may possibly be used by 7 horizontally adjacent pixels covered by 7 frames in the exemplary 7×7 frame.

The architecture illustrated in FIG. 7 may be further illustrated with the following example. Suppose the line of pixels under process is the line of pixels 706-1 through 706-*i* shown in image frame 702, suppose the current pixel which has arrived is pixel 704. Furthermore, pixel 704 is the first pixel needed for the current frame with a 45 degree rotation mapping. The rotation assignment buffer 712 (whose entries are populated before the computation) selects the Coord Map 708 queue-head, which is the next coordinate awaited for the filtering operation. For adjacent pixels, the awaited coordinate is the coordinate adjacent to the one at the head of the queue. For example, if 4 is the first coordinate awaited by the first pixel under process (for a 45 degree rotation), the coordinate awaited for the second pixel is 5, 6 for the third, and so forth for each pixel with the same 45 degree rotation. The element at the head of the Coord Map 708 queue-head could hence be used by seven horizontally adjacent pixels, and thus in one embodiment, a counter is run to increment the coordinate value at the head of the Coord Map 708 buffer. The coordinate value is compared against the current X Coordinate value of the arriving pixel by the comparator 724. If there is a match, the filter coefficients are chosen from the Coeff Map 710 buffer stack and are multiplied with the current pixel value (i.e., x[n]). In one embodiment, these coefficients can be for the entire filter bank, in which case Coeff Map 710 buffer stack would include more entries than illustrated. This enables the computation of the partially weighted sum of the filtering operation and is accumulated in the output buffer 718 every pixel clock cycle for all the pixels in the current horizontal line under process. Thus, the filtering operation is completed for the current arriving pixel, pixel 704 in the example, as soon as it arrives and obviates the need for an input buffer.

Figure 8:
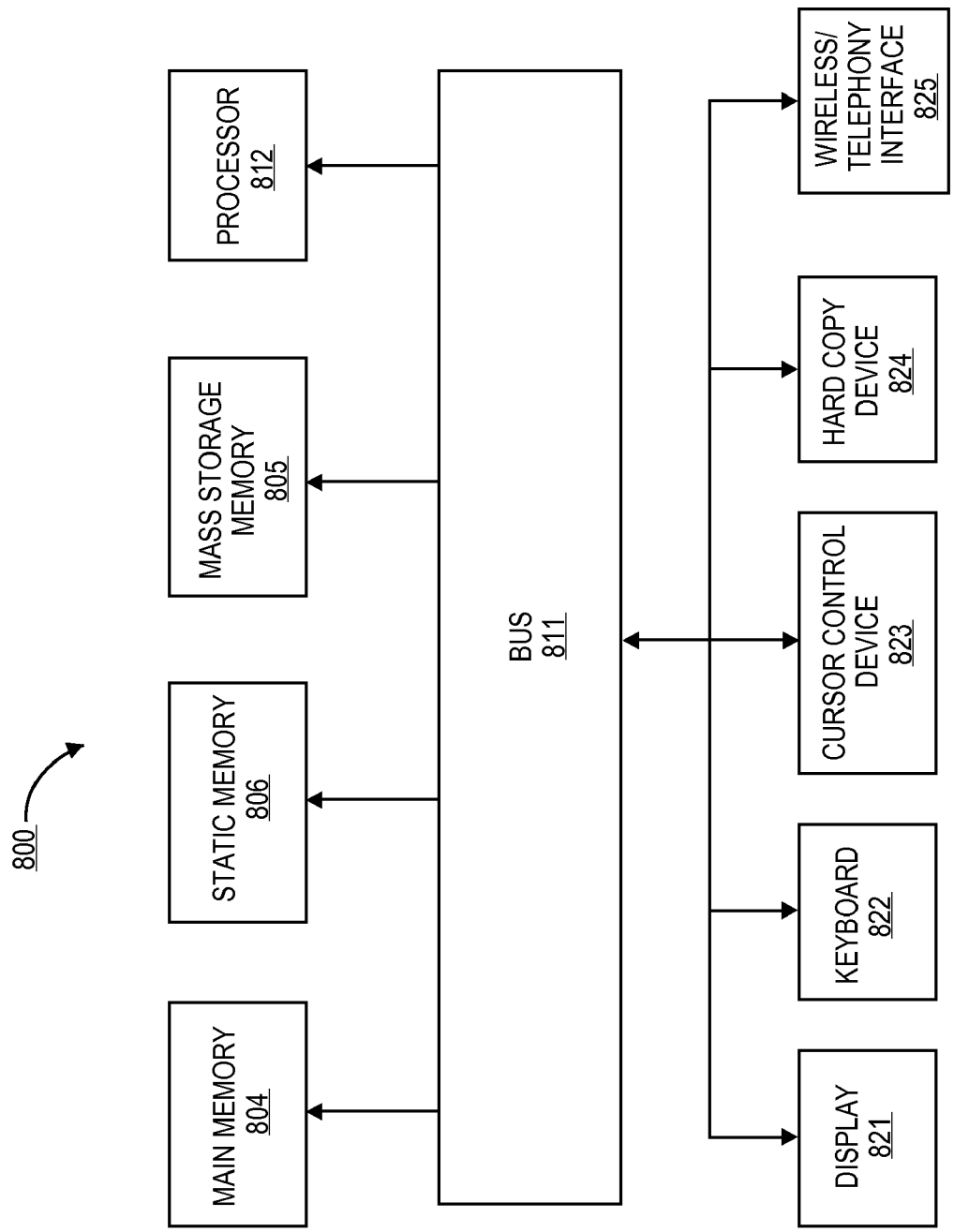
FIG. 8 is a block diagram of a computer system.

FIG. 8 is a block diagram of a computer system that may perform one or more of the operations described herein. In one embodiment, one or more components of the computer system may be integrated into an optical imaging system. In another embodiment, the computer system may control an optical imaging system. Referring to FIG. 8, computer system 800 may comprise an exemplary client or a server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, track ball, track pad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A digital image processing system comprising:
    an index mapping module to determine a rotation angle index to control the rotation of an input patch of an image based on the (x,y) pixel coordinates of the image patch;
    a rotation module to rotate the input patch of the image based on the rotation angle index; and
    a filter engine module applied to a rotated version of the input patch of the image wherein the filter engine module applies a set of fixed filters whose outputs are combined as a weighted sum, and wherein the combination is based on linear weighting coefficients that are computed based on a radius of the input patch.

2. The system of claim 1, wherein the filter engine module further comprises:
    a finite set of filters with outputs from each of the filters in the finite set to be combined to obtain a filtered output image.

3. The system of claim 2, wherein the outputs of the finite set of filters are linearly combined using a set of weights.

4. A digital image processing system comprising:
    an index mapping module to determine a rotation angle index to control the rotation of an input patch of an image based on the (x,y) pixel coordinates of the image patch;
    a rotation module to rotate the input patch of the image based on the rotation angle index; and
    a filter engine module applied to a rotated version of the input patch of the image, wherein the filter engine module further comprises:
        a finite set of filters with outputs from each of the filters in the finite set to be combined to obtain a filtered output image, wherein the outputs of the finite set of filters are linearly combined using a set of weights, and wherein the set of weights include weight $\alpha_i(\rho)$ for filter i where $\rho$ is a radius index of a current pixel to be filtered.

5. The system of claim 2, wherein the finite set of filters are configured with fixed filter coefficients optimized.

6. The system of claim 2, wherein each of the finite set of filters is a finite impulse response (FIR) filter.

7. The system of claim 6, wherein one or more of the finite set of FIR filters has a rectangular geometry.

8. A digital image processing system comprising:
    an index mapping module to determine a rotation angle index to control the rotation of an input patch of an image based on the (x,y) pixel coordinates of the image patch, wherein the index mapping module determines the rotation angle index by calculating an approximation of the arctan value for a coordinate (x, y) associated with the input patch relative to a center point of the image;
    a rotation module to rotate the input patch of the image based on the rotation angle index; and
    a filter engine module applied to a rotated version of the input patch of the image.

9. A digital image processing system comprising:
    an index mapping module to determine a rotation angle index to control the rotation of an input patch of an image based on the (x,y) pixel coordinates of the image patch, wherein the index mapping module determines the rotation angle index by utilizing sign detection with a set of linear functions of points X and Y for a coordinate (X, Y) associated with the input patch relative to a center point of the image;
    a rotation module to rotate the input patch of the image based on the rotation angle index; and
    a filter engine module applied to a rotated version of the input patch of the image.

10. The system of claim 1, wherein the rotation angle index is a set of binary control values, each corresponding to a multiplexor stage.

11. The system of claim 1, further comprising:
    a radius index mapping module to determine the radius of a current input pixel location using an input pixel coordinate that defines the center of the image.

12. A digital image processing system comprising:
    an index mapping module to determine a rotation angle index to control the rotation of an input patch of an image based on the (x,y) pixel coordinates of the image patch;
    a radius index mapping module to determine the radius of a current input pixel location using an input pixel coordinate that defines the center of the image, wherein the radius is utilized to determine one or more weights for linearly combining outputs of a filter bank;
    a rotation module to rotate the input patch of the image based on the rotation angle index; and
    a filter engine module applied to a rotated version of the input patch of the image.

13. A method comprising:
    determining a rotation angle index to control rotation of an input patch of an image;
    rotating the input patch of the image based on the rotation angle index; and
    filtering a rotated version of the input patch of the image, wherein the filtering is achieved by application of a set of fixed filters whose outputs are combined as a weighted sum, and wherein the combination is based on linear weighting coefficients that are computed based on a radius of the input patch.

14. The method of claim 13, wherein rotating further comprises:
    rotating the input patch based on the rotation angle index with an index mapping structure with a plurality of sequential stages of multiplexers.

15. The method of claim 14, wherein the index mapping structure applies one of eight rotation angles to rotate the input patch.

* * * * *